March 23, 1926.
C. F. RUBSAM
1,577,985
DEMOUNTABLE RIM WHEEL
Filed April 25, 1923
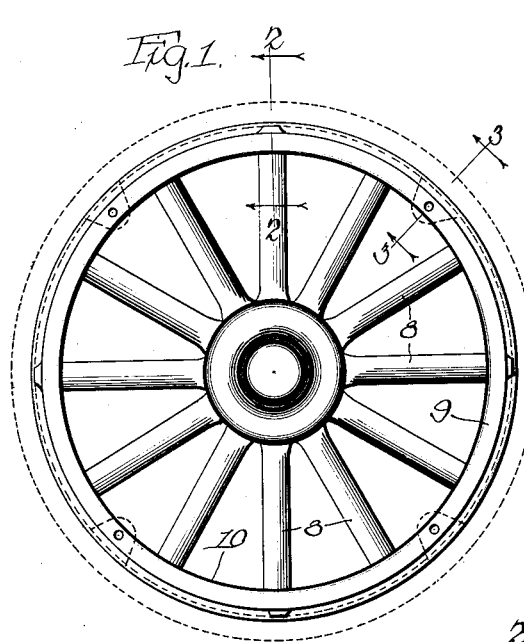
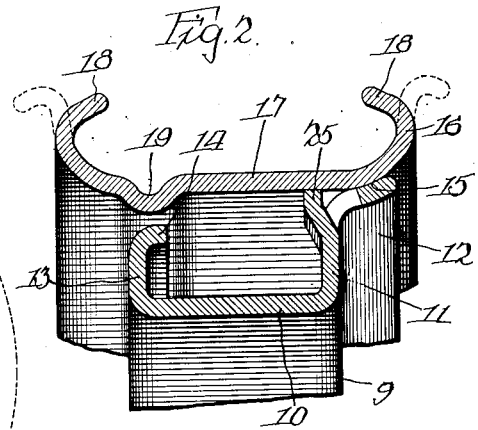
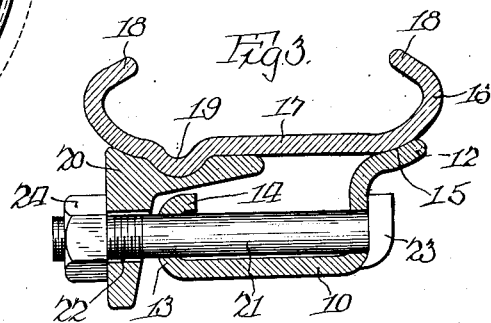
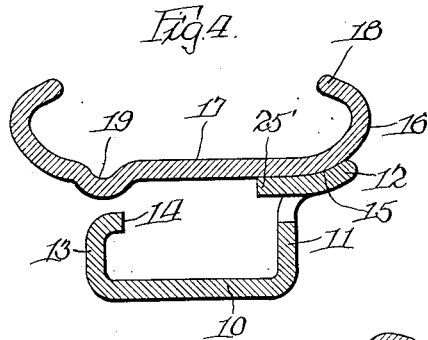
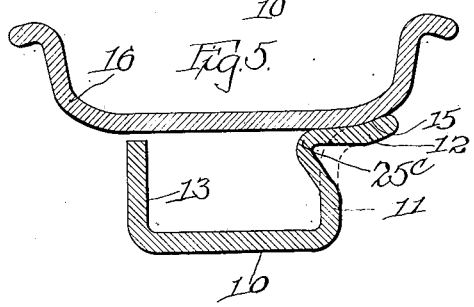
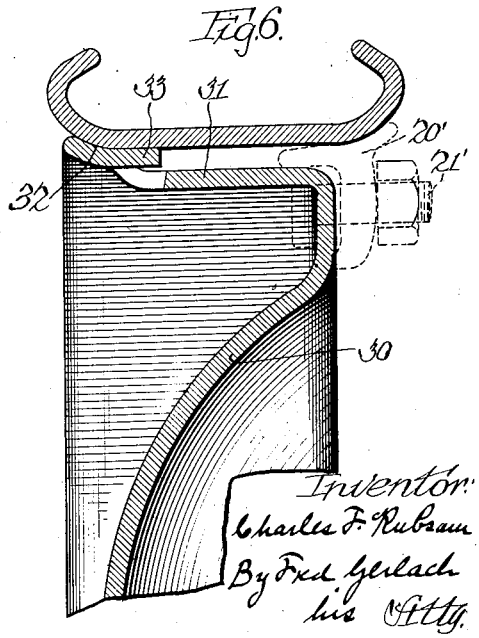

Patented Mar. 23, 1926.

1,577,985

UNITED STATES PATENT OFFICE.

CHARLES F. RUBSAM, OF JACKSON, MICHIGAN, ASSIGNOR TO RUBSAM CORPORATION, OF JACKSON, MICHIGAN, A CORPORATION OF DELAWARE.

DEMOUNTABLE-RIM WHEEL.

Application filed April 25, 1923. Serial No. 634,422.

*To all whom it may concern:*

Be it known that I, CHARLES F. RUBSAM, a citizen of the United States, and a resident of Jackson, in the county of Jackson and State of Michigan, have invented certain new and useful Improvements in Demountable-Rim Wheels, of which the following is a full, clear, and exact description.

The invention relates to demountable rim-wheels and more particularly those in which a demountable tire-carrying rim is secured on a fixed metal rim on the wheel-body.

It is now common practice to provide wheel-bodies with fixed rims having a flared flange at one side which forms an annular flared seat for a correspondingly shaped portion adjacent the corresponding side of the demountable tire rim and lugs and bolts for clamping the demountable rim on said flange to secure the tire-rim on the fixed rim. In practice, it is customary to place the tire-rim on the fixed rim by first inserting the stem of the tire-valve through the usual hole in the fixed rim, the tire-rim being initially seated at a point on said flange adjacent said stem and then swinging the opposite portion of the tire towards the fixed rim until all portions of one side of the tire-rim are seated on the flange. To permit placement and removal by reversal of the placement operation, the necessary clearance must be provided at the other or front side of the fixed rim. The retaining lugs are successively drawn up to secure the tire-rim after such placement. In practice, it has been found that the tapered engaging surfaces at the rear side of the fixed and tire rims and the necessary clearance between them at the other side result in an uneven or non-central positioning of the tire-rim around the fixed rim, particularly if great care is not exercised in uniformly operating the bolts to shift the lugs. When this occurs, the tire and tire-rim are not truly positioned on the wheel-body.

The primary object of the present invention is to provide improved means for insuring the true positioning or centering of the tire-rim on the fixed rim and this object is attained by providing the fixed rim with upstruck portions or tongues adjacent the flared retaining flange at the rear side thereof, so that as the tire-rim is being seated on the flared flange of the fixed rim, it will be truly positioned, so that it cannot be forced into an off-center position, even though the retaining lugs are unevenly shifted.

Another object of the invention is to provide an improved tire-rim centering-means which is adapted for channel-shaped fixed rims.

Other objects of the invention will appear from the detailed description.

The invention consists in the several novel features hereinafter set forth and more particularly defined by claims at the conclusion hereof.

In the drawings: Fig. 1 is a side elevation of a wheel embodying the invention. Fig. 2 is a section on line 2—2 of Fig. 1. Fig. 3 is a section on line 3—3 of Fig. 1. Fig. 4 is a section showing a modification. Fig. 5 is a section of a modification. Fig. 6 is a section, showing the invention applied to a disk-wheel.

The invention is exemplified in a wheel-body which comprises spokes 8 and a metal rim 9. Said rim is of the channelled type and comprises a base 10 in which the outer ends of the spokes 8 are secured, an outwardly extending flange at one side of the base having a radial portion 11 and a flared or inclined portion 12, and a radial flange 13 at the other side of the base, the latter flange having an inturned portion 14 to strengthen the rim. Flange-portion 12 has a flared annular seat 15 which corresponds to a similarly shaped portion on one side of the demountable tire-rim 16, said seat serving as an annular support for the rim and also as a transverse stop against which it may be clamped. The tire rim 16 comprises a base 17 and side or tire-holding flanges 18 which may be of any suitable and well known form to adapt the tire-rim for a clincher casing, as shown by full lines in Fig. 2 or a straight side casing, as shown by dotted lines. The base 17 of the tire-rim is provided with an inrolled bead 19 adjacent the outer periphery of the flange 13 of the fixed rim, but with sufficient clearance for the angular placement and removal of the tire-rim, hereinbefore described. This inrolled bead strengthens the rim at its front side where it is not annularly supported. Lugs 20 are suitably and fixedly secured on the inner periphery of the tire-rim by welding or riveting. Bolts 21 are retained in the fixed rim and extend through flanges 11 and 13 and through openings 22 in the lugs 20. Each bolt is provided with a head 23 engaging an outer face of flange 11 and a nut 24 to engage the lug 20 to force the tire-rim against, and secure it on, its seat.

The inner periphery of the tire-rim 16 is usually straight in cross-section or truly cylindrical inwardly of the curved or flared portion which fits on the annular seat 15 of the fixed rim, and upstruck tongues 25 are bent inwardly from flange 11 to engage said straight or cylindrical portion of the inner periphery of the tire-rim 16 adjacent to the annular seat 15. Being disposed adjacent said seat, it becomes possible to place and remove the tire rim from the fixed rim angularly, if necessary, without any substantial clearance between the outer faces of the tongues and the inner periphery of the tire-rim and consequently these tongues will accurately center or truly position the tire-rim around the fixed rim at all times while the tire-rim is positioned on the annular seat 15. These upstruck tongues are preferably disposed at points intermediate those at which the retaining lugs 20 and bolts 21 are placed, so that they will be effective to center the rim at points between the intermediate retaining devices. These upstruck tongues 25 exemplify integral portions of the fixed rim which are disposed adjacent the annular seat for the tire-rim which are adapted to center or truly position the tire-rim around the fixed rim and to retain it there while the retaining devices are being operated to secure the tire-rim on the fixed rim and thus prevent the tire-rim from being clamped in off-center relation on the fixed rim. These tongues further exemplify centering means of this character which is adapted for use on the channel-shaped fixed rims.

In the modification shown in Fig. 4, tongues 25' are formed so as to extend inwardly from the flared flange 12, in lieu of upwardly and inwardly from flange 11, as exemplified in Fig. 2. In Fig. 5, the side-flange of the fixed rim is indented, as at 25ᶜ, to form centering devices for the demountable rim.

In Fig. 6, the invention is exemplified in connection with a disk-wheel comprising a body 30 with an integral rim-base 31 having a flared flange 32 and upstruck tongues 33 for centering the tire-rim. Bolts 21' and wedge-lugs 20' are used to clamp the tire-rim on flange 32 and to secure it on the wheel-body.

In the operation of each of the several forms of the invention, the upstruck tongues serve to center and truly position the tire-rim while it is being placed on the annular seat of the fixed rim and to thus retain the rim while the clamping devices are being manipulated to secure the tire-rim on the fixed rim. Furthermore, these devices prevent the improper placement of the tire rim on the fixed rim.

The invention exemplifies a demountable wheel rim in which provision is made by means of centering tongues or portions which are disposed adjacent the annular flared seat for the tire rim and at points where substantially no clearance is necessary for placement and removal of the rim, so that they will effectively center and position the rim during such placement. The invention further exemplifies a channelled fixed rim with integral centering devices of this character. By circumferentially positioning the centering devices between the retaining lugs, the minimum number of clamping devices will suffice to hold the tire rim in its true position upon the fixed rim. The inrolled bead in the tire rim stiffens that side of the tire-rim which is not directly supported by an annular seat.

It will be understood that any desired number of centering tongues and retaining devices may be used.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a demountable rim wheel, the combination of a wheel body provided with a fixed channelled metal rim having a base, and integral flanges at the sides of the base respectively, one flange having a flared seat for one side of a demountable tire rim, centering devices adjacent the flange having the flared seat, spaced apart longitudinally on the fixed rim with longitudinal clearances between them, to position the demountable rim around said flange, and devices for clamping the demountable rim on said flange.

2. In a demountable rim wheel, the combination of a wheel body provided with a fixed channelled metal rim having a base and integral flange at the sides of the base respectively, one flange having a flared seat for one side of a demountable tire rim, centering devices integral with said fixed rim and adjacent said latter flange to position the demountable rim around said flange, and devices for clamping the demountable rim on said flange.

3. In a demountable rim wheel, the combination of a wheel body provided with a fixed channelled metal rim having a base and integral flanges at the side of the base respectively, one flange having a flared seat for one side of a demountable tire rim, upstruck tongues on the fixed rim and adjacent said latter flange, formed to center the demountable rim around said flange, and devices for clamping the demountable rim on said flange.

4. In a demountable rim-wheel, the combination of a wheel-body provided with a fixed channelled rim comprising a base and an integral flange at each side of the base, one of said flanges being provided with a flared annular seat for holding the demountable tire-rim, devices on the fixed rim and adjacent the annular seat, having surfaces to center the demountable tire-rim on the fixed rim, and devices for clamping the demountable rim on said flange.

5. In a demountable rim-wheel, the combination of a wheel-body provided with a fixed channelled metal rim comprising a base and an integral flange at each side of the base, one of said flanges being provided with a flared annular seat for holding the demountable tire-rim, upstruck tongues on the fixed rim and adjacent the annular seat, having surfaces to center the demountable tire-rim on the fixed rim, and devices for clamping the demountable rim on said flange.

6. In a demountable rim-wheel, the combination of a wheel-body provided with a fixed and channelled metal rim comprising a base and an integral flange at each side of the base, one of said flanges being provided with a flared annular seat for holding the demountable tire-rim and with upstruck tongues having surfaces to center the demountable tire-rim on the fixed rim, and devices for clamping the demountable rim on said flange comprising bolts held in the flanges of the fixed rim.

7. In a demountable rim-wheel, the combination of a wheel-body provided with a fixed metal rim having a base and an integral flange at one side of the base, the flange having a flared seat, a demountable tire-rim having one of its sides adapted to fit on the flared seat and an inrolled bead adjacent its other side, devices adjacent the flanged side of the fixed rim spaced apart longitudinally with longitudinal clearances between them and having surfaces to center the demountable rim around said flange, and devices for clamping the demountable rim on said flange.

8. In a demountable rim-wheel, the combination of a wheel-body provided with a fixed metal rim having a base and an integral flange at each side of the base, one of the flanges having a flared seat, a demountable tire-rim having one of its sides adapted to fit on the flared seat and an inrolled bead adjacent the flange at the other side, upstruck tongues adjacent the flared seat having surfaces to center the demountable-rim around said flange, lugs fixed to the demountable rim, and bolts carried by the fixed rim and extending through said lugs, for clamping the demountable rim on said flange.

9. In a demountable rim wheel, the combination of a wheel body provided with a fixed metal rim having a base and an integral flange at one side of the base, the flange having a flared seat for one side of a demountable tire rim, centering devices formed of metal bent from said flange, to position the demountable rim around said seat, and devices for clamping the demountable rim on said seat.

10. In a demountable rim wheel, the combination of a wheel body provided with a fixed metal rim having a base and an integral flange at one side of the base, the flange having a flared seat for one side of a demountable tire rim, instruck portions of said flange formed to center the demountable rim around said seat, and devices for clamping the demountable rim on said seat.

Signed at Jackson, Michigan, this 16th day of April, 1923.

CHARLES F. RUBSAM.